US010326706B2

(12) United States Patent
Volkening et al.

(10) Patent No.: US 10,326,706 B2
(45) Date of Patent: Jun. 18, 2019

(54) DATA PACKET PROCESSING SYSTEM ON A CHIP

(71) Applicant: LANTIQ BETEILIGUNGS-GMBH & CO. KG, Neubiberg (DE)

(72) Inventors: Ingo Volkening, Singapore (SG); Hak Keong Sim, Singapore (SG); Ritesh Banerjee, Bangalore (IN)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 99 days.

(21) Appl. No.: 15/312,753

(22) PCT Filed: May 29, 2015

(86) PCT No.: PCT/EP2015/062025
§ 371 (c)(1),
(2) Date: Nov. 21, 2016

(87) PCT Pub. No.: WO2015/185461
PCT Pub. Date: Dec. 10, 2015

(65) Prior Publication Data
US 2017/0208015 A1    Jul. 20, 2017

(30) Foreign Application Priority Data

Jun. 4, 2014   (SG) .......................... 10201402893Y

(51) Int. Cl.
*H04L 12/863*     (2013.01)
*H04L 12/935*     (2013.01)
(Continued)

(52) U.S. Cl.
CPC .......... *H04L 47/6215* (2013.01); *H04L 45/26* (2013.01); *H04L 49/109* (2013.01);
(Continued)

(58) Field of Classification Search
CPC ... H04L 47/6215; H04L 69/22; H04L 49/109; H04L 45/26; H04L 69/325
See application file for complete search history.

(56) References Cited

U.S. PATENT DOCUMENTS

2003/0043800 A1    3/2003  Sonksen et al.
2011/0080916 A1    4/2011  Davies et al.
(Continued)

FOREIGN PATENT DOCUMENTS

EP          1113620 A1    7/2001

OTHER PUBLICATIONS

International Search Report, International Application No. PCT/EP2015/062025, dated Aug. 17, 2015.

*Primary Examiner* — Jae Y Lee
(74) *Attorney, Agent, or Firm* — Eschweiler & Potashnik, LLC

(57) ABSTRACT

An on-chip data packet processing method and corresponding integrated circuit, wherein data packets are received at an ingress port and processed with an on-chip wire-speed engine. The processing comprises adding metadata to the data packets, forwarding the processed data to an on-chip QoS unit, altering the metadata of the data packets and/or providing further metadata to the data packets. The data packets are forwarded from the on-chip QoS unit to an on-chip data consumer. If the data consumer is a processing unit the data packets are processed in a first processing step, redirected from the processing unit to the QoS unit and the step of forwarding the data packets to an on-chip data consumer is repeated.

14 Claims, 3 Drawing Sheets

(51) Int. Cl.
*H04L 12/721* (2013.01)
*H04L 12/933* (2013.01)
*H04L 29/06* (2006.01)
*H04L 12/54* (2013.01)
*H04L 29/08* (2006.01)

(52) U.S. Cl.
CPC .......... *H04L 49/3063* (2013.01); *H04L 69/22* (2013.01); *H04L 12/5692* (2013.01); *H04L 69/325* (2013.01)

(56) References Cited

U.S. PATENT DOCUMENTS

| | | | |
|---|---|---|---|
| 2012/0177047 A1* | 7/2012 | Roitshtein | H04L 69/22 370/392 |
| 2013/0142205 A1* | 6/2013 | Munoz | H04L 45/08 370/419 |
| 2015/0324306 A1* | 11/2015 | Chudgar | G06F 13/385 710/308 |

* cited by examiner

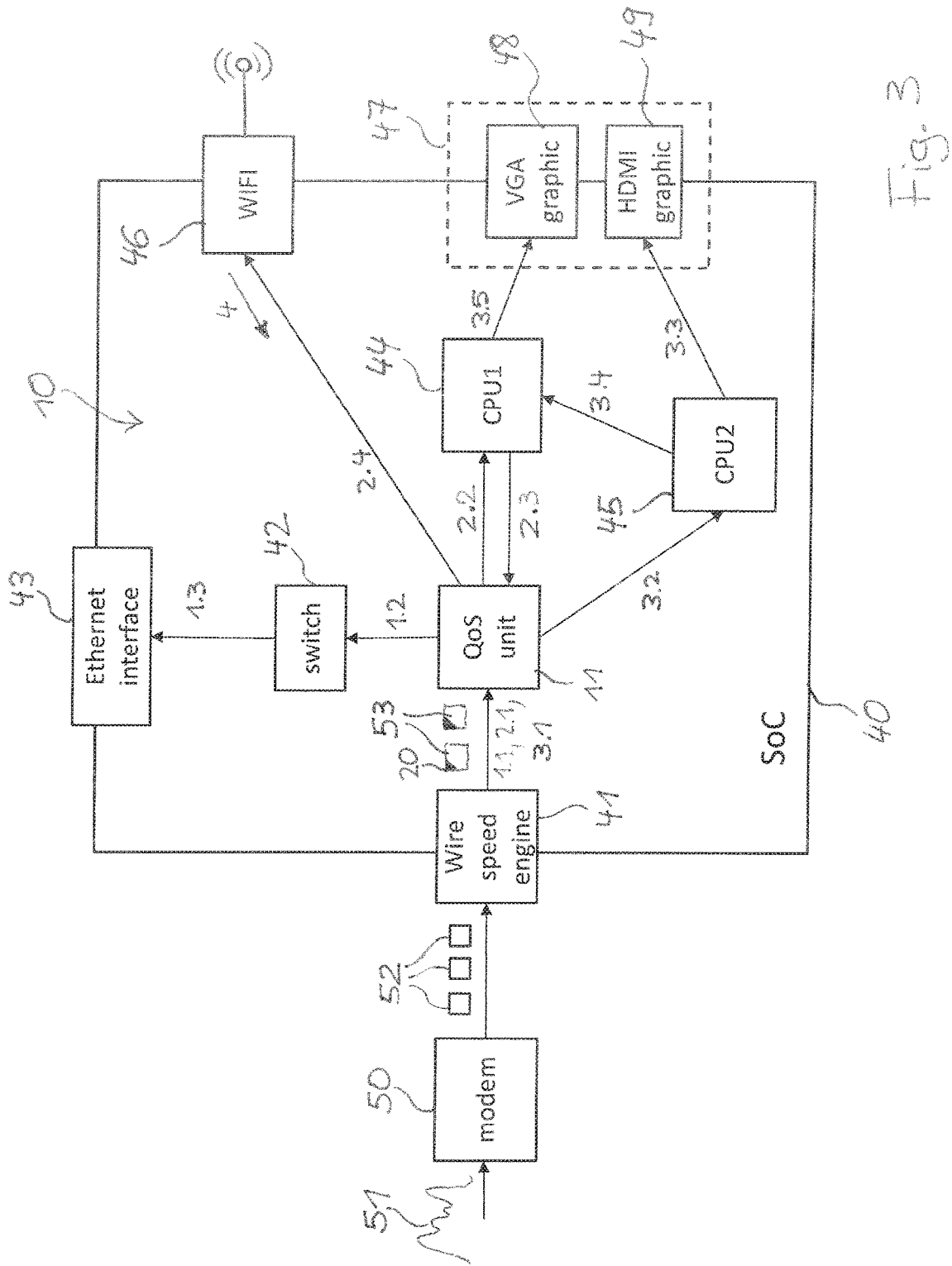

DATA PACKET PROCESSING SYSTEM ON A CHIP

This application is a National Phase entry application of International Patent Application No. PCT/EP2015/062025 filed on May 29, 2015, which claims priority to Singapore Application SG 10201402813Y, filed on Jun. 4, 2014 the contents of which are herein incorporated by reference in their entirety.

A system on a chip (SoC) provides essential hardware components of a on a single chip in a space saving manner. A typical System on a chip comprises a microcontroller, one or more microprocessor or DSP cores, memory blocks such as ROM, RAM, EEPROM and flash memory, tact generators, peripherals such as counter-timers, real-time timers and power-on reset generators, external interfaces such as USB, FireWire, Ethernet, USART, SPI, analog interfaces, such as ADCs and DACs, voltage regulators and power management circuits. A data bus connects these components. DMA controllers route data directly between external interfaces and memory. Thereby, the data traffic bypasses the processor core thereby enhancing the data throughput of the SoC.

FIELD

With ever increasing requirements for broadband applications and diverse data consumers it has become beneficial to provide a quality of service (QoS) management for data packets even in small scale systems which are sold to private end users, such as home gateways. In particular, QoS can be used for IP networks. For example, the wireless multimedia extensions standard provides a QoS management for WIFI applications such as voice over IP on WIFI. According to one aspect of QoS management, a priority flag is added to data packets to provide a priority for the handling of the data packets.

The present specification discloses an on-chip data packet processing method and a corresponding integrated circuit wherein data packets are received at an ingress port and the data packets are with an on-chip wire-speed engine. In particular, the processing comprises adding metadata to at least one of the data packets, forwarding the processed data to an on-chip QoS unit over a data bus and altering the metadata of the data packets and/or providing further metadata to the data packets. Some examples of metadata according to the current specification are explained further below with respect to FIG. 2.

By way of example, the wire-speed engine may comprise one or more CPUs or hardware accelerators, wherein a hardware accelerator is a hardware element design of a narrowly defined task. The hardware accelerator may also exhibit a small level of programmability but is in general not sufficiently flexible to be adapted to other tasks. For the predefined task, the hardware accelerator shows a high performance compared with a load store on a fixed operating frequency. Another benefit is low power consumption resulting in a low energy per task figure.

The wire speed engine forwarding the data packets or part of them over a data bus from the on-chip QoS unit to an on-chip data consumer. The on-chip data consumer may comprise among others, an egress port, a switch, and a processing unit (CPU). The type of the on-chip data consumer to which the data is forwarded to is dependent on the metadata.

In particular, if the data packets are forwarded to a processing unit the data packets are processed in a first processing step and the processed data, which includes processed data packets or processed portions of the data packets, is redirected from the processing unit to the QoS unit and the step of forwarding the data packets, or part of them, to a data consumer is repeated.

According to one embodiment, the metadata comprises in particular a flow related field, such as a constraint that pertains to a message flow precedence or also usage control specific constraints. By way of example, the delivered quality of service may depend on the data usage by a customer or the kind of service the customer has paid for.

According to another embodiment, the metadata comprises a session ID field, which represents a layer-2 session or layer-3 session associated to a packet flow. This provides a context for the further processing of the data packet and for setting a priority for processing and forwarding the data packet.

According to yet another embodiment, the metadata comprises a tunnel ID field that represents a layer-3 encrypted data flow.

According to a further embodiment, the metadata comprises a flow ID that represents a bridging or routing flow number identified and used for processing of data packets.

According to a further embodiment, the metadata comprises a processing stage related field, which defines a path and a sequence of processing through a QoS engine.

According to a further embodiment, the metadata comprises a a QoS related field, which specifies a predetermined quality of service to be achieved.

In particular, according to one embodiment, the QoS related field determines the handling of the data packet in a QoS queue.

According to a further embodiment, the QoS related field of the data packet comprises a classifier field that is used together with other metadata fields to determine the handling of the data packet in a QoS queue.

According to a further embodiment, the metadata comprises an egress port field that defines a physical port to which the data packet is forwarded to.

In a further embodiment, the metadata comprises a sub-interface ID field, which defines virtual ports behind a physical egress port. For example, the sub interface may specify one of multiple available IP networks that a packet can be routed to.

The metadata may also comprises further information about the message, such as in particular the message source and destination or destinations.

According to a further aspect, the current specification discloses an integrated circuit or microchip, and in particular a system on a chip. The integrated circuit comprises a wire speed engine for processing data packets, wherein the processing comprises the provision of metadata to the data packets. The wire speed engine is connected to one or more ingress ports such as for example a data input that is connected to a modem.

Furthermore, a QoS unit is provided for processing and forwarding the data packets, which is connected to the wire speed engine. The processing of the data comprises the provision and adjustment of metadata of the data packets.

At least one microprocessor is provided for processing the data packets, wherein the processing is dependent on the metadata, for example by providing a memory on the integrated circuited, the memory comprising an instruction set which comprises parsing and identifying the meta-data and conditional processing depending on the meta data.

Furthermore, the integrated circuit comprises one or more egress ports, which are connected to the QoS unit and/or to the at least one microprocessor.

According to a further embodiment, the wirespeed engine and the QoS unit are operative to handle output data to multiple networks, wherein the networks comprise at least a wireless network, such WLAN, WIFI or the like, and a wired IP network, such as for example an ethernet.

Furthermore, according to another embodiment, the wirespeed engine and the QoS unit are capable of handling input data from multiple networks, wherein the multiple networks comprise at least a wireless network such as WLAN, WIFI or the like, and a wired IP network, such as Ethernet, an further type intranet or internet, which is connected via a modem or other networks.

BRIEF DESCRIPTION OF THE DRAWINGS

The subject of the present specification is now explained in further detail with respect to the following Figures in which FIG. 3 shows a system on a chip comprising the packet processing system of FIG. 1.

DETAILED DESCRIPTION

Figure 1:
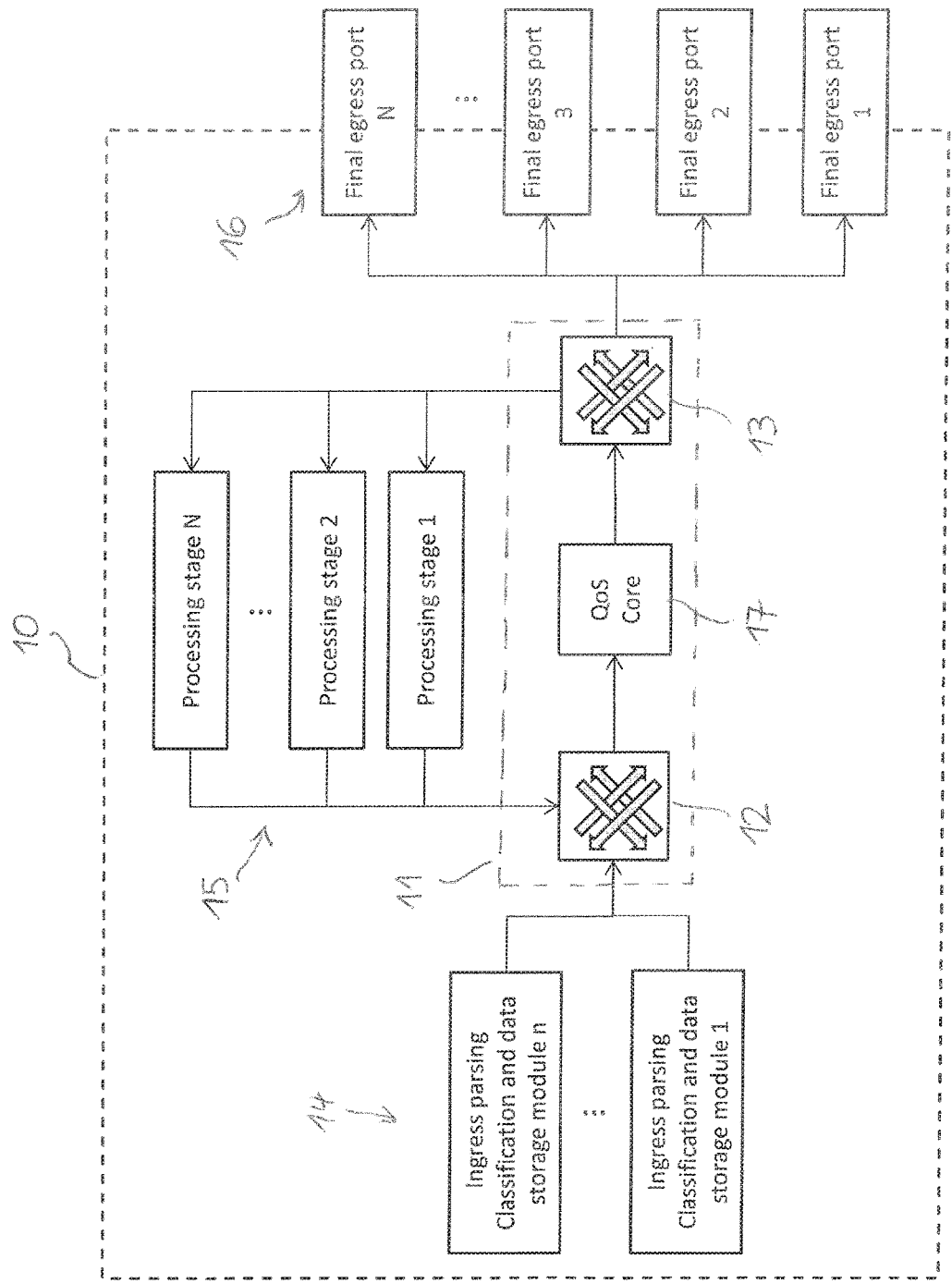
FIG. 1 shows a schematic diagram of a packet processing system according to current specification.

In the following description, details are provided to describe the embodiments of the application. It shall be apparent to one skilled in the art, however, that the embodiments may be practised without such details.

Although the above description contains much specificity, these should not be construed as limiting the scope of the embodiments but merely providing illustration of the foreseeable embodiments. Especially the above stated advantages of the embodiments should not be construed as limiting the scope of the embodiments but merely to explain possible achievements if the described embodiments are put into practise. Thus, the scope of the embodiments should be determined by the claims and their equivalents, rather than by the examples given.

A packet processing system according to the application comprises a network processor architecture comprises a centralized Quality of Service (QoS) management that provides
- multipass handling in a QoS engine with multiple entrances into the QoS engine
- application of the same or similar rules-sets for the same traffic flow over multiple path in the network processor
- ingress based QoS classification at wire-speed without the need of dropping data before stored rules and QoS rules could be applied
- distributed QoS handling on multiple CPUs
- avoiding physical duplication of data for multicast support
- capability of redirecting data to cache for more efficient DDR/bandwidth utilization.

The packet processing system according to the application provides further capabilities, such as port level congestion control before QoS decision.

The packet processing system according to the present specification avoids or limits the use complex decentralized QoS approaches with complementary or replaced QoS management software based QoS. The packet processing system according to the present specification is well adapted to high load situations and bursty traffic.

Furthermore, the packet processing system according to the current specification provides an architecture with detection and classification of packets at wire-speed engines before the data packets are processed and routed. A classification of traffic can be carried out before QoS decisions have to be taken, even in a burst traffic scenario.

A packet processing method according to the current specification uses the guaranteed classification capability and applies QoS rules on a global egress port basis. By this method, the complete system on a chip (SoC) will receive a common QoS treatment for traffic flows regardless of the type of Egress interface/port. The packet processing method further comprises the technique of multipass templates. The multipass template technique serves the purpose of allowing parsing, classification, QoS rule execution and decision of the final Egress port of the traffic flow.

By deciding the final egress port of the traffic flow, the packet processing applies rules of intermediate processing steps required to reach the final egress port. This allows a homogenous configuration of the traffic flow towards multiple stages in the SoC processing with specific QoS rule set per stage before reaching the final egress or interface port.

According to the present specification, meta-data is applied to the descriptor of data allowing hand-over of packets in the traffic flow without data copy. Modification stages can load the packets of the flow or just portions of it and enqueue the packets back to the central QoS engine. The packets in the multipass architecture use a unique identifier for their flow type in every processing stage.

Among others, the metadata is provided for assuring a predetermined quality of service to an external data consumer such as a screen, a telephone, an audio equipment, a multimedia application on a computer, a wireless or wired internet provider, a household appliance, a surveillance system, an automated machinery control, a measurement system etc.

The packet processing system comprises a central QoS engine, which uses techniques of multipass templates to apply QoS rules and handling to traffic flows allowing re-entrance of the same flow going through multiple processing stages, which use unique QoS rules per stage, arriving at the final egress stage without software re-programming.

FIG. 1 shows a schematic outline of a packet processing system 10 according to current specification. The packet processing system comprises a QoS engine 11 with multipass enqueue ports 12 for receiving packet meta data, multipass dequeue ports 13 for providing QoS handled meta data, a QoS core 17 and ingress modules 14. During packet process, the ingress modules handle the parsing, classification, congestion control and storage of ingress Data. Furthermore, the processing system comprises processing stages 15, which are connected to the QoS engine 11 in a feedback loop. The processing stages 15 may be realized on a single processor, on multiple processors or they may be dynamically assigned or scheduled to a processor. The QoS engine 11 is connected to egress ports 16 of the packet processing system 10.

The processing stages 15 perform dedicated functions and processing steps for packets of the traffic flow as a subsequent task that is different from forwarding the traffic flow to a final egress port 16. The final egress ports 16 are used as destination for fully processed data packets.

The multipass architecture provides single or multiple ingress parsing, traffic classification, congestion control and data storage modules, one or multiple processing stages 15, and one or more final egress ports 16. All of these elements can have different numbers and there is no requirement to have the same number.

Figure 2:
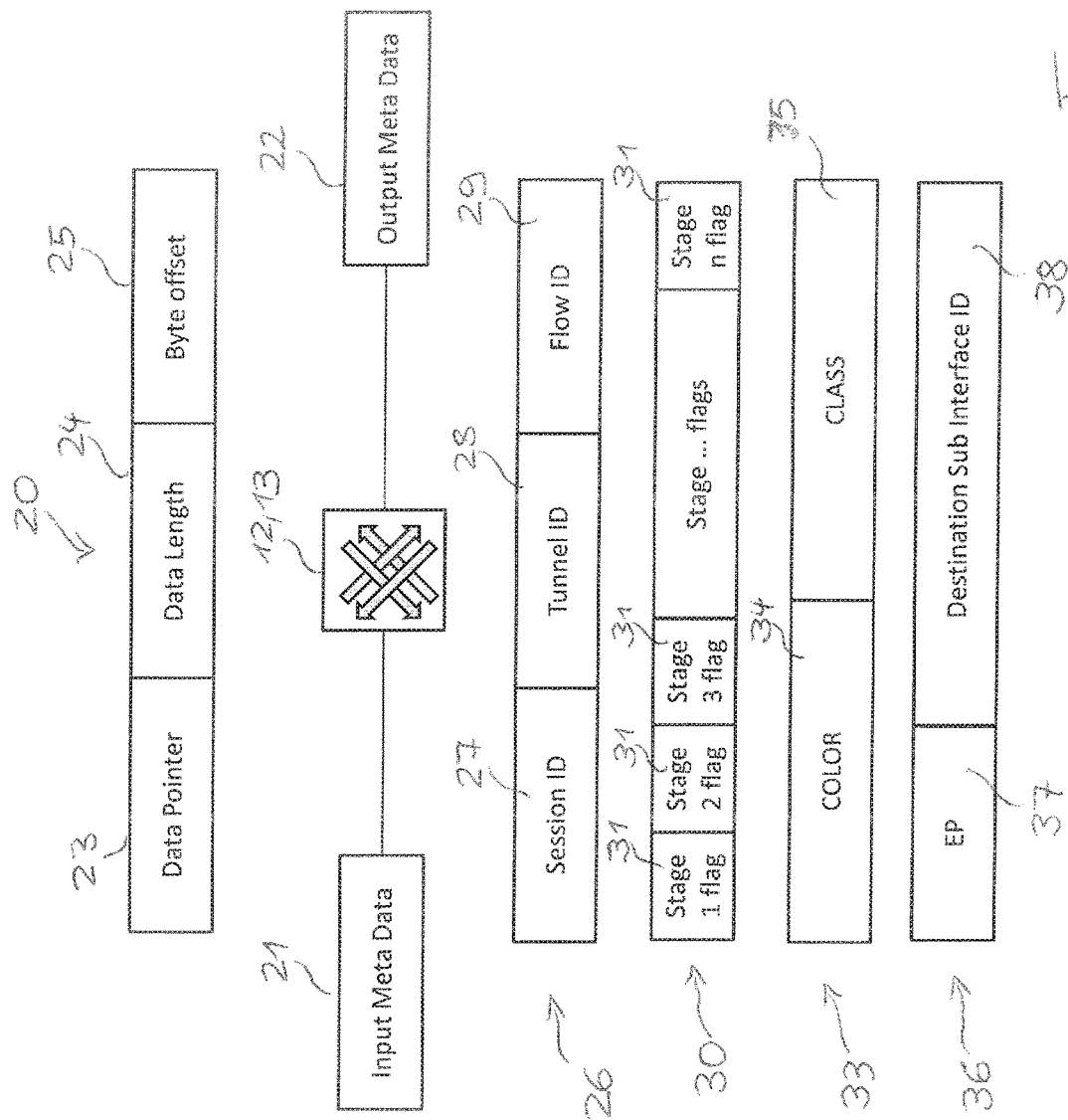
FIG. 2 shows metadata information in data packets of the packet processing system of FIG. 1.

FIG. 2 shows the inclusion of metadata in data packets of the packet processing system 10.

According to the current specification, the following types of fields may be included in a meta data section 20 of a data packet for encoding meta data 21, 22. The multipass enqueue ports 12 and the multipass deque ports 13 are operative to modify input meta data 21 to output meta data 22, for example by adding data fields or modifying values of data fields.

The meta data section 20 comprises, by way of example, a data pointer 23, a data length indicator 24 and a byte offset indicator 25.

Among others, the meta data 21, 22 comprises
1. Flow related fields 26, such as
   a. a session ID field 27, which represents the layer-2 or layer-3 session associated to a packet flow
   b. a tunnel ID field 28, which represents the layer-3 encrypted flow which requires special treatment in the processing steps
   c. a flow ID field 29, which represents a bridging or routing flow number identified and used for processing of these packets.

Herein, layers 2 and 3 refer to the OSI network model, in which layer-2 is the data link layer and layer-3 is the network layer.

2. Processing stage related fields 30, such as
   a. Stage 1 to N flags 31 defining the path and sequence of processing through the common QoS engine 11.
3. QoS related fields 33, such as
   a. a color field 34 used as packet color for QoS handling function policing. According to one embodiment, this information is used together with other fields to determine the QoS queue in the common QoS engine 11.
   b. a class field 35 used as packet classifier after the parsing of packet fields to determine its priority QoS handling. This information is used together with other fields to determine the QoS queue in the common QoS engine 11.
4. Destination related fields 36, such as
   a. an egress port (EP) field 37, which defines the physical port the data should be forwarded to
   b. a destination sub-interface ID field 38, which defines virtual ports behind the physical egress port 16. Both fields together define the final destination port of the packet FIG. 3 shows an exemplary embodiment of a system on a chip 40 that comprises the packet processing system 10. The system on a chip 40 comprises, among others, a wire speed engine 41, a switch 42, an Ethernet interface 43, a first CPU 44, a second CPU 45, a WIFI interface 46, a graphic processing unit 47 with a VGA interface 48 and with a HDMI interface 49. The QoS unit 11 is shown in more detail in FIG. 1.

The wire speed engine 41 is connected to an input of the QoS unit 11, the switch 42 is connected to an output of the QoS unit 11, the Ethernet interface 43 is connected to an output of the switch 42, the first CPU 44 is connected to an output of the QoS unit 11, the second CPU 45 is connected to an output of the QoS unit 11, the WIFI interface 46 is connected to an output of the QoS unit 11, the VGA interface 48 is connected to the first CPU 44 and the HDMI interface 49 is connected the second CPU 45.

A modem 50 is connected to an input of the wire speed engine 41. In one embodiment, the System on a chip 40 and the modem 50 are provided on a common circuit board, which is not shown in FIG. 3.

During operation, the modem receive an encoded digital data signal 51, such as QAM modulated electrical signal or light signals, decodes the digital data of the digital data signal 51 and forwards the digital data in form of data packets 52. The modem 50 also converts data packets 52 into encoded digital data signals 51. For simplicity, this direction of data flow is not shown in FIG. 3.

The wire speed engine 41 scans the data packets 52 or portions of them, provides the data packets 52 with meta data 20 and forwards them to the QoS unit 11 as transformed data packets 53 in wire speed. In FIG. 3, the m-th step of the n-th example mentioned below is indicated by the numbers "n.m" next to the data flow arrows.

According to a first example, the wire speed engine 41 provides a data packet with metadata and sends it to the QoS unit 11 in a first step. In a second step, the QoS unit 11 alters the metadata of the data packet and forwards the data packet to the switch 42. In a third step the switch 42 forwards the data packet to the Ethernet interface 43 according to the metadata.

According to a second example, the wire speed engine 41 provides a data packet with metadata and sends it to the QoS unit 11 in a first step. The QoS unit 11 provides the data packet with metadata indicating that the data packet is to be processed, in a first processing stage, and to be send back to the QoS unit 11 and forwards it to the first CPU 44 in a second step. In a third step, the first CPU 44 sends back the data packet to the QoS unit 11. In a fourth step, the QoS unit 11 sends the data packet to the WIFI interface 46.

According to a third example, the wire speed engine 41 provides a data packet with metadata and sends it to the QoS unit 11 in a first step. The QoS unit 11 forwards the data packet to the second CPU 45 in a second step. The second CPU 45 processes the data packet to HDMI data in a first processing stage and sends the data packet to the HDMI graphic interface 49 in a third step.

In a fourth step, the second CPU 45 sends the data packet to the first CPU 44 for further processing to VGA data in a second processing stage. In a fifth step, the first CPU 44 sends the data packet to the VGA interface 48.

According to a fourth example, which is not explained in detail, data packets are received from the WIFI interface 46, forwarded to the wirespeed engine 41, the QoS unit 11, processed in one or more processing stages, and finally routed to the modem 50. Similar to the preceding examples, the data packets are provided with metadata and the processing depends on the metadata.

According to another example, data packets are received from the Ethernet interface 43, forwarded to the wire speed engine 41 and to the QoS unit 11, processed in one or more processing stages, and forwarded to the WIFI interface 46. Similar to the preceding examples, the data packets are provided with metadata and the processing depends on the metadata.

The interfaces of the system on chip 40, such as the Ethernet interface 43, the WIFI interface 46, the VGA interface 48, the HDMI interface 49 may provide an egress port, an ingress port or both. For example, in one embodiment, the HDMI interface 49 provides the ingress port 1 of FIG. 1, the VGA interface 48 provides the ingress port 3 of FIG. 1, the WIFI interface 46 provides the ingress port 2 and the egress port 2 of FIG. 1, and the Ethernet interface 43 provides a fourth egress port "egress 4".

| Reference | |
|---|---|
| 10 | packet processing system |
| 11 | QoS unit |
| 12 | enqueue ports |
| 13 | dequeue ports |
| 14 | ingress ports |
| 16 | egress ports |
| 20 | meta data section |
| 21 | input meta data |
| 22 | output meta data |
| 23 | data pointer |
| 24 | data length indicator |
| 25 | byte offset indicator |
| 26 | flow related fields |
| 27 | session ID field |
| 28 | tunnel ID field |
| 29 | flow ID field |
| 33 | QoS related fields |
| 34 | color field |
| 35 | class field |
| 36 | destination related fields |
| 37 | egress port field |
| 38 | destination sub-interface field |
| 40 | System on a chip |
| 41 | wire speed engine |
| 42 | switch |
| 43 | ethernet interface |
| 44 | first CPU |
| 45 | second CPU |
| 46 | WIFI interface |
| 47 | graphic processing unit |
| 48 | VGA interface |
| 49 | HDMI interface |
| 50 | modem |
| 51 | encoded digital signal |
| 52 | data packets |
| 53 | processed data packets |

The invention claimed is:

1. An on-chip data packet processing method comprising receiving data packets at an ingress port,
processing the data packets with an on-chip wire-speed engine, the processing comprising adding metadata to the data packets to form transformed data packets,
forwarding the transformed data packets to an on-chip Quality of Service (QoS) circuit,
modifying the metadata of the transformed data packets by providing further metadata to the transformed data packets or altering the metadata of the transformed data packets,
forwarding the modified, transformed data packets from the on-chip QoS circuit to an on-chip data consumer, the on-chip data consumer being selected from an egress port, a switch, and a processing unit, the type of the on-chip data consumer being dependent on the modified metadata, and
if the modified, transformed data packets are forwarded to a processing circuit:
processing the modified, transformed data packets in a first processing step to form processed data,
redirecting the processed data from the processing circuit back to the QoS circuit, and
repeating the step of forwarding the processed data to a data consumer.

2. The method of claim 1, wherein the metadata comprises a flow related field.

3. The method of claim 1, wherein the metadata comprises a session ID field, which represents one of a layer-2 session or layer-3 session associated with a packet flow.

4. The method of claim 1, wherein the metadata comprises a tunnel ID field that represents a layer-3 encrypted data flow.

5. The method of claim 1, wherein the metadata comprises a flow ID that represents a bridging or routing flow number identified and used for processing of data packets.

6. The method of claim 1, wherein the metadata comprises a processing stage related field which defines a path and a sequence of processing through a QoS engine.

7. The method of claim 1, wherein the metadata comprises a QoS related field.

8. The method of claim 7, wherein the QoS related field determines the handling of the data packet in a QoS queue.

9. The method of claim 8, wherein the QoS related field of the data packet comprises a classifier field that is used together with other metadata fields to determine the handling of the data packet in a QoS queue.

10. The method of claim 1, wherein the metadata comprises an egress port field that defines a physical port to which the data packet is forwarded to.

11. The method of claim 1, wherein the metadata comprises a sub-interface ID field, which defines virtual ports behind a physical egress port.

12. An integrated circuit, the integrated circuit comprising
a wire speed engine circuit configured to process data packets, by providing metadata to the data packets to form transformed data packets, wherein the wire speed engine circuit is connected to one or more ingress ports,
a Quality of Service (QoS) circuit configured to modify the metadata of the transformed data packets, the modifying comprising providing further metadata to the transformed data packets or altering the metadata of the transformed data packets, the QoS circuit being connected to the wire speed engine circuit,
at least one microprocessor configured to process the modified, transformed data packets, the processing being dependent on the modified metadata, and
one or more egress ports, the egress ports being connected to the QoS circuit and/or to the at least one microprocessor,
wherein the QoS circuit is configured to forward the data packets to an on-chip data consumer, the on-chip data consumer being selected from the one or more egress ports, a switch, and the at least one microprocessor, the type of the on-chip data consumer being dependent on the metadata, and
wherein the microprocessor is operable to, if the data packets are forwarded to the microprocessor:
process the data packets in a first processing step,
redirect the processed data from the processing unit to the QoS circuit and repeat the step of forwarding the data packets to a data consumer.

13. The integrated circuit of claim 12, wherein the wire-speed engine circuit and the QoS circuit are configured to handle output data to multiple networks, the networks comprising at least a wireless network and a wired IP network.

14. The integrated circuit of claim 12, wherein the wire-speed engine circuit and the QoS circuit are configured to handle input data from multiple networks, the networks comprising at least a wireless network and a wired IP network.

* * * * *